Jan. 28, 1969 R. N. MELLOTT 3,424,923
BINARY CIRCUIT
Filed June 29, 1965
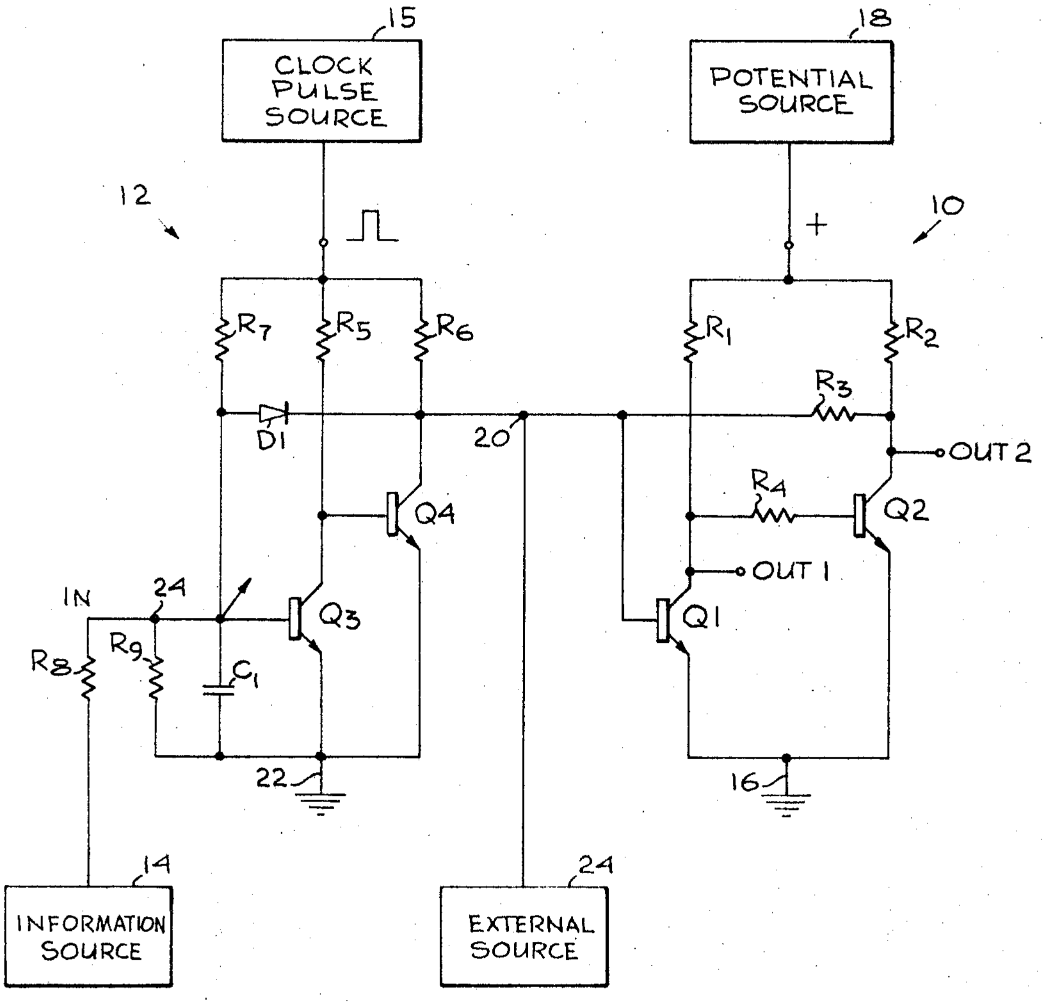
INVENTOR
ROBERT N. MELLOTT
BY Samuel Lindenberg
Arthur Freilich
ATTORNEY 3,424,923
Patented Jan. 28, 1969

3,424,923
BINARY CIRCUIT

Robert N. Mellott, Palos Verdes Estates, Calif., assignor to Logicon, Inc., Redondo, Calif., a corporation of California Filed June 29, 1965, Ser. No. 468,045
U.S. Cl. 307—247 3 Claims
Int. Cl. H03k 17/60

ABSTRACT OF THE DISCLOSURE

A binary storage circuit which is responsive to information available at its input terminal just prior to the occurrence of a clock pu'se but which is insensitive to information applied to its input terminal at any other time. The circuit includes an input stage and a bistable stage. The bistable stage includes a control terminal to which current may be applied to switch it to a first state and from which current may be extracted to switch it to a second state. The input stage comprises a binary stage which is not bistable except during the duration of a clock pulse. That is, between clock pulses, the input stage follows the input information and no path is provided to either apply current to or extract current from the control terminal. When a clock pulse occurs, the input stage latches in a stage determined by the input information and then either applies current to or extracts current from the bistable stage.

This invention relates generally to circuitry for storing binary information.

Digital data processing apparatus including computers and calculators usually handle information in some type of binary code, e.g. a standard binary code, a binary coded decimal code, etc. In such apparatus, some type of binary devices must usually be provided for representing digits in such codes. Electronic flip-flop circuits are often used for such purposes.

Most data processing apparatus is of the synchronous type in which each operation is performed in response to a clock pulse. Thus, for example, a word comprised of a plurality of binary digits (bits) is entered into a register in response to a specific clock pulse. In such situations, it is usually desired that the register be insensitive to changes occurring at its input terminal between clock pulses. Also, in order to avoid the development of a race condition, it is usually desired that the register be insensitive to input information changes occurring during the width of the clock pulse.

In accordance with the present invention, a circuit for storing binary information is provided which circuit is responsive to a clock pulse for storing information available at its input terminal, just prior to the clock pulse. The circuit is insensitive to information available at its input terminal at any time other than just prior to a clock pulse and thus the circuit is insensitive to changes occurring during a clock pulse. Accordingly, as long as the clock pulse has a width greater than a certain minimum, its exact width is not critical since no race condition can possibly develop, regardless of how wide the clock pulse actually is.

Briefly, in a preferred embodiment of the invention, a circuit is provided including an input stage and a bistable or flip-flop stage. The flip-flop stage is provided with a control terminal. So long as no current is applied to or extracted from this control terminal, the flip-flop stage will not change its state. The input stage which includes first and second switches is connected to the control terminal. The switches are interconnected so that once either one is conducting, it will hold the other one off.

The switches are responsive to the clock pulse which tends to bias both switches on but only one switch will actually go into conduction, depending upon the state of a binary information signal provided to the input stage. When the first switch conducts, the clock pulse is steered into the control terminal to cause the flip-flop stage to define its first stable state. When the second switch conducts, the clock pulse is steered through a path other than into the control terminal, and in addition, a low impedance path connected to the control terminal is closed to extract current from the control terminal to thus cause the flip-flop stage to define its second stable state.

The novel features that are considered characteristic of this invention are set forth with particularity in the appended claims. The invention itself both as to its organization and method of operation, as well as additional objects and advantages thereof, will best be understood from the following description when read in connection with the accompanying drawing, which is a schematic circuit diagram of the preferred embodiment of the present invention.

Attention is now called to the drawing which illustrates a preferred embodiment of the invention including a flip-flop stage 10, capable of defining first and second stable states, and an input stage 12, responsive to binary information provided by a source 14 and clock pulses provided by a source 15 for controlling the state of the flip-flop stage 10.

The flip-flop stage 10 includes first and second transistors Q1 and Q2, each of which is illustrated as being of the NPN type. The emitters of both transistors Q1 and Q2 are connected to a source of ground potential 16. The collectors of transistors Q1 and Q2 are respectively connected through resistors R1 and R2 to a source of positive potential 18. A resistor R3 connects the collector of transistor Q2 to the base of transistor Q1 and a resistor R4 connects the collector of transistor Q1 to the base of transistor Q2.

The collector of either transistor Q1 or Q2 can serve as the output terminal of the flip-flop stage 10. It can be seen that by choosing appropriately valued components, the flip-flop stage 10 will be bistable so that either transistor Q1 or transistor Q2 will conduct current through the collector-emitter path thereof. When either one of the transistors Q1 or Q2 conducts, the other transistor will be cut off.

More particularly, let it initially be assumed that transistor Q1 is conducting. Its collector potential will reside very close to ground thereby back-biasing the base-emitter junction of transistor Q2 to thus hold it off. Similarly, if transistor Q2 is conducting, it will hold transistor Q1 off. When transistor Q1 is conducting, base current is supplied to it through resistors R2 and R3 from the source of positive potential 18. When transistor Q2 is conducting, base current is supplied to it through resistors R1 and R4.

In order to switch the state of the flip-flop stage 10, current can either be driven into or extracted from a control terminal 20 connected to the base of transistor Q1. More particularly, assuming initially transistor Q2 to be conducting, if sufficient current is supplied through control terminal 20 to the base of transistor Q1, transistor Q1 will start to conduct thereby steering the current from resistor R1 through the collector-emitter path of transisor Q1 rather than through resistor R4. Thus, no base current will be supplied to transistor Q2 and it will accordingly cut off. If transistor Q1 had already been conducting when current was driven into control terminal 20, it will of course continue to conduct.

When transistor Q1 conducts, its base current is provided through resistors R2 and R3. If this base current is extracted from the control terminal 20 however, transistor Q1 will cut off thereby biasing transistor Q2 into conduction.

As previously noted, it is desirous that the flip-flop stage 10 switch to a state defined by the output of the source of binary information 14 just prior to a clock pulse provided by source 15. If the output of the information source 14 changes during a clock pulse, it is important that this have no affect on the state assumed by the flip-flop stage 10. Also of course, it is important that the flip-flop stage 10 be insensitive to changes occuring at the output of the information source 14 at any time other than immediately prior to the occurrence of a clock pulse. The input stage 12 coupling the information source 14 and clock pulse source 15 to the flip-flop stage 10 assures that these conditions are met.

The input stage 12 includes a pair of transistors of the NPN type Q3 and Q4. The emitters of transistors Q3 and Q4 are connected to a source of ground potential 22. The collectors of transistors Q3 and Q4 are respectively connected through resistors R5 and R6 to the output terminal of the clock pulse source 15. Also connected to the output of source 15 is a resistor R7 which is connected to the base of transistor Q3. The base of transistor Q4 is connected to the collector of transistor Q3. The collector of transistor Q4 is connected to the base of transistor Q3. The base of transistor Q3 is connected to the junction point 24 defined in a resistive voltage divider string comprised of resistors R8 and R9. A capacitor C1 is connected in parallel with resistor R9. The remote side of resistor R8 is connected to the output of the source of binary information 14.

Let it be assumed that the binary information source 14 is capable of providing two different output voltage levels such that the first or true voltage level is sufficiently positive to forward bias the base-emitter junction of transistor Q3 and the second or false voltage level is insufficient to forward bias that junction. Let it also be assumed that the clock pulse provided by source 15 is a positive pulse going from ground to a substantial positive potential. In the absence of the clock pulse, i.e. when the output of source 15 is at ground, there is no source of current for transistor Q4 sufficient to permit it to conduct and consequently current will neither be driven into or extracted from the flip-flop stage 10. The current supplied from the source 14 is insufficient to switch the flip-flop stage 10 since the voltage at the base of transistor Q3 will be clamped by the forward drop across the base-emitter junction and the voltage applied to the base of transistor Q1 will be lower than this by the forward drop across diode D1. Capacitor C1 is provided to hold the base of transistor Q3 at the level established by the source 14 and prevents the clock pulse from changing the state of the input stage independent of the source 14.

When source 15 does provide a clock pulse however, current will be conducted in the collector-emitter path of either transistor Q3 or transistor Q4 depending upon the state of the information source 14. More particularly, if information source 14 is in a true state providing a relatively high potential output, transistor Q3 will conduct current from the source 15 through the collector-emiter path thereof. Thus, the base-emitter junction of transistor Q4 will be back-biased to hold transistor Q4 off. On the other hand, if information source 14 defines a false state thereby providing an insufficient potential to the base of transistor Q3 to forward bias it, current will be supplied from source 15 through resistor R5 to the base of transistor Q4 to forward bias it. With transistor Q4 closed, base current that would otherwise be provided to transistor Q3 through resistor R7 is shunted through diode D1 and the transistor Q4. Thus, once transistor Q4 is conducting, transistor Q3 is held off inasmuch as its source of base current is cut off. It will be recalled that when transistor Q3 is conducting, transistor Q4 is deprived of base current.

When transistor Q3 is conducting and transistor Q4 is cut off, clock pulse current from the source 15 flows both through resistor R7 and diode D1, and through resistor R6 into the control terminal 20. The current driven into the control terminal 20 either switches transistor Q1 on or holds it on for the reasons previously mentioned. On the other hand, if transistor Q4 is conducting, all the clock pulse current supplied by source 15 will be shunted therethrough and transistor Q4 will provide a low impedance path from control terminal 20 to ground. Thus, base current to transistor Q1 will be cut off to thereby either maintain or switch transistor Q2 into conduction.

From the foregoing, it should be appreciated that a circuit arrangement has been provided in which the state of the flip-flop stage 10 is determined by the information provided by source 14 just prior to a clock pulse provided by source 15. Changes at the output of source 14 occurring between clock pulses can have no affect on the state of the flip-flop stage 10 inasmuch as the potential at the collector of transistor Q4 will remain substantially constant in the absence of a clock pulse. Similarly, changes in the output of source 14 during the width pulse provided from source 15 can have no affect on the flip-flop stage 10 inasmuch as such changes will not change the state of the input circuit 12. Thus, as long as the width of the pulse provided by source 15 is greater than a certain minimum, no race condition can possibly develop in a system employing the illustrated circuit.

In the event it is desired to have the capability of forcing the state of the flip-flop stage 10 independent of the clock pulse, an external source 24 can be tied to the control terminal 20 as illustrated. The external source 24 should include means enabling it to selectively act as a current source to force transistor Q1 into conduction or a current sink to force transistor Q2 into conduction.

Although the values of the various components are not critical, typical values for such components are set forth hereinafter merely for the purpose of more specifically illustrating one operable embodiment of the invention. It should however be appreciated that innumerable variations could be made in the values of the components listed without departing from the spirit or intended scope of the invention. Likewise, other changes will be readily apparent to those skilled in the art such as using other transistor types, different potential levels, etc., and it is of course also intended that such variations fall within the scope of the invention.

| | |
|---|---|
| R1 | 1.5K |
| R2 | 1.5K |
| R3 | 3.3K |
| R4 | 3.3K |
| R5 | 15.0K |
| R6 | 3.3K |
| R7 | 22.0K |
| R8 | 3.3K |
| R9 | 1.5K |
| C1, μμf. | 470 |
| Source 18, v. | +15 |
| Clock pulse, v. | +14 |
| Information input: | |
| True, v. | +3.5 |
| False, v. | +1.2 |

What is claimed is:

1. A binary storage system comprising:

a source of clock pulses;

a first transistor having a base, a collector, and an emitter, said emitter being connected to a source of reference potential;

switching means coupling said source of clock pulses to said base for selectively either permitting base current to be supplied thereto to forward bias said transistor or preventing base current from being supplied thereto to hold said transistor off;

a control terminal connected to said collector;

means connecting said source of clock pulses to said collector for driving current through the emitter-collector path thereof when said transistor is forward biased and for driving current through said control terminal when said transistor is held off;

said switch means comprising a second transistor having a base, a collector, and an emitter;

means connecting said second transistor emitter to said emitter of said first named transistor;

means connecting said second transistor collector to said base of said first named transistor;

a source of binary information signals; and means directly coupling said source of binary information signals to said second transistor base.

2. The system of claim 1 including a flip-flop stage having an input terminal and responsive to current driven into said input terminal for defining a first state and responsive to current extracted from said input terminal for defining a second state; and means coupling said control terminal to said input terminal.

3. The system of claim 1 including means coupling said source of clock pulses to said second transistor base for selectively supplying base current thereto; and conduction means coupling said second transistor base to said collector of said first named transistor for steering base current from said second transistor.

References Cited

UNITED STATES PATENTS

| | | | |
|---|---|---|---|
| 2,873,363 | 2/1959 | Wanlass | 307—88.5 |
| 2,951,951 | 9/1960 | Morgan | 307—88.5 |
| 3,112,413 | 11/1963 | Zimbel | 307—88.5 |
| 3,170,075 | 2/1965 | Mellott | 307—88.5 |
| 3,231,763 | 1/1966 | Mellott | 307—88.5 |
| 3,283,175 | 11/1966 | Webb | 307—88.5 |
| 3,324,307 | 6/1967 | Mellott | 307—88.5 |

ARTHUR GAUSS, *Primary Examiner.*

H. DIXON, *Assistant Examiner.*

U.S. Cl. X.R.

307—269, 289